United States Patent [19]

Newell

[11] 3,715,782
[45] Feb. 13, 1973

[54] DEVICE FOR SECURING A LINE
[76] Inventor: E. Strohm Newell, 2350 6th Avenue, Apt. 9-B, San Diego, Calif. 92101
[22] Filed: Dec. 9, 1971
[21] Appl. No.: 206,427

[52] U.S. Cl. ...................24/116, 24/130, 24/129, 114/218
[51] Int. Cl............................F16g 15/04, F16g 11/04
[58] Field of Search.........24/129 R, 129 B, 130, 116; 114/218; 280/179 A

[56] References Cited
UNITED STATES PATENTS

| 585,564 | 6/1897 | Freeman | 24/129 R |
|---|---|---|---|
| 2,510,862 | 6/1950 | Buel | 24/130 |
| 2,836,141 | 5/1958 | Brydon | 114/218 |
| 3,090,343 | 5/1963 | Ronsheim | 24/130 |
| 3,273,417 | 9/1966 | Sevrence | 24/129 B |

Primary Examiner—Bernard A. Gelak
Attorney—Neil F. Markva et al.

[57] ABSTRACT

The device comprises a pair of opposing line engaging surfaces having a structural configuration effective for mutually cooperating with a line placed therebetween. The mutually cooperating surfaces have means that are effective to cause the line to be wedged therebetween when a load is directed along the line. Line guiding means are incorporated on the surfaces causing the line to move therebetween when the line is draped or dragged longitudinally along the device. At least one pair of arcuate hook portions extend in the direction toward the line load. The hook portions are laterally displaced with respect to each other and are turned downwardly and away from the direction of the load. The hook portions include an outboard surface and an inboard surface. The device of this invention may be used for securing lines composed of various constructions such as twisted cords, chain links and the end of a bolt on a turnbuckle.

13 Claims, 12 Drawing Figures

DEVICE FOR SECURING A LINE

BACKGROUND OF THE INVENTION

There are many different types of lines which need to be secured. Such lines may take several forms such as a rope composed of twisted cords, a chain, cable constructions, turnbuckles and the like which need to be secured when a load is applied.

The use of various types of fastening devices on trucks is well known as evidenced by U.S. Pat. No. 3,572,755. There the fastening device is mounted on the outside of the box of a pickup truck and used as a device for securing a line that is holding material in the truck box. It is also well known to use camper modules that are constructed to fit in the box of a pickup truck. A chain or a line with a turnbuckle at its end is generally used to hold the camper in place within the truck. One end of the line is attached to the camper module and the other end of the line is attached to a fastening device of some type. It is desired to have a clamping device that is very easy to use with various types of loads which might be carried in the truck.

There are many other types of fastening devices where it is desired to hold a line such as a rope. Such situations exist where a watercraft is moored to a dock, or a line on a boat is to be secured at one end when a load is placed thereon. Most prior art securing means for this type of use might easily be worked loose such as when a boat is moored at a dock and the boat is riding up and down on the constantly moving water. Such a device in the prior art is shown in U.S. Pat. No. 3,398,714.

PURPOSE OF THE INVENTION

The primary object of this invention is to provide a device for securing various types of lines.

Another object of the invention is to provide a securing device for a line such as a rope which eliminates the necessity for tying the load-free end of the line.

A further object of this invention is to provide a securing device which may be used in many different situations necessitating the fastening of a line on which a load is placed.

A still further object of this invention is to provide a securing device used with a line such as a rope wherein a double locking mechanism is incorporated.

A further object of this invention is to provide a securing device which may be used for mooring on a vessel or a dock, or both, which eliminates the necessity for tying knots each time a vessel is moored or cast off.

Another object of the invention is to provide a securing device which may be used with a rope, a chain or the end bolt of a turnbuckle.

SUMMARY OF THE INVENTION

The securing device of this invention includes a pair of opposing line engaging surfaces between which the line may be wedged when a load is placed or directed therealong. The line engaging surfaces have mutually cooperating surfaces which constitute the wedge forming means. One feature of this invention is the incorporation of a line guiding means in the structural configuration to cause the line to move into the wedge forming means when the line is draped or dragged longitudinally along the device. The wedge forming means is constructed for receiving and holding a line in a substantially frictionless manner. The basic concept is to have the line become more tightly engaged with the securing device in response to any load pulling on the line.

Another feature of this invention is to incorporate a double locking mechanism wherein at least one pair of arcuate hook portions extends in a direction toward the line load. The hook portions are laterally displaced with respect to each other and are turned downwardly and away from the direction of the load. The hook portions include an outboard surface and an inboard surface.

The double locking mechanism is used in conjunction with a line such as a rope which is first placed in the wedge forming means. The load-free section of the line is wrapped forwardly around the device toward the load and then transversely between the hook portions and adjacent the inboard surfaces thereof. That is, the inboard surfaces extend downwardly by an amount effective to receive the load-free section of the rope between the inboard surface and the loaded section of the line which extends from the wedge forming means to the load. In this way, the loaded line section pulls against the load-free line section which is disposed transversely of the laterally displaced hook portions. Consequently, the line is pulling against itself and therefore is being more tightly engaged with the wedge forming means. This configuration eliminates the necessity for tying the free end of the rope. Numerous advantages are associated with such a configuration and the securing device of the invention may be used in a multiple number of circumstances.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
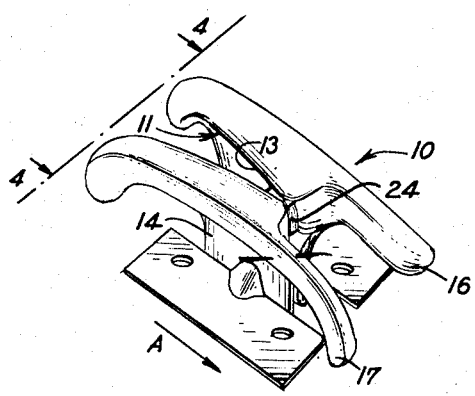
FIG. 1 is a perspective view of a device made in accordance with this invention.
Figure 5:
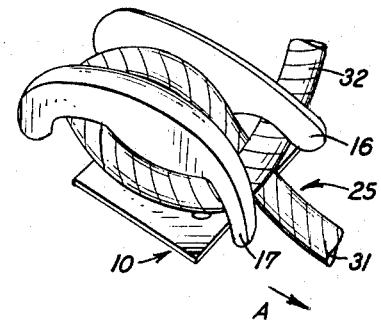
FIG. 5 is a perspective view of the device of FIG. 1 shown used with a line composed of twisted cords.
Figure 2:
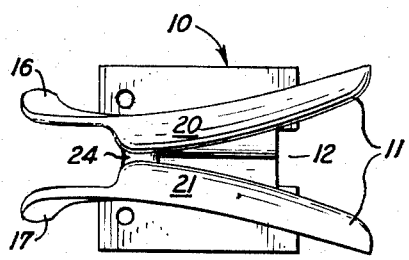
FIG. 2 is a top plan view of the device of FIG. 1.
Figure 3:
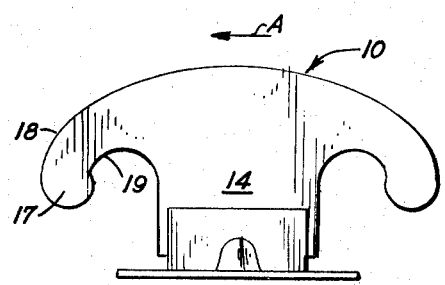
FIG. 3 is a side elevational view of the device of FIG. 1.
Figure 4:
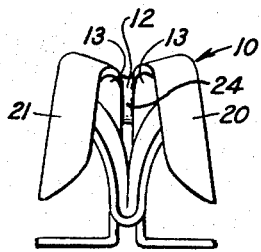
FIG. 4 is an end view from the wide side of the wedge forming means of the device of FIG. 1.
Figure 6:
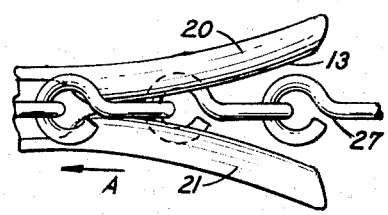
FIG. 6 is a fragmentary top plan view of the device of FIG. 1 shown used with a chain.

More specifically, a securing device, generally designated 10, includes a pair of opposing line engaging surfaces 11 forming a cleft 12 therebetween. The surfaces 11 have a structural configuration effective for mutually cooperating with a line placed in the cleft 12. When a line, generally designated 25, as shown in FIG. 5 is placed in the cleft 12, the mutual cooperating surfaces 11 are effective to cause the line 25 to be wedged more tightly therein when a load is applied to the line 25.

In this specific embodiment, the line engaging surfaces 11 include undercut portions 13. Undercut portions 13 form a portion of the wedge forming means for receiving and holding a line in a substantially frictionless manner. The undercut line engaging surface portions 13 converge in a direction toward the line load. The direction of the line load is designated A in the drawings. The line engaging surface portions 13 are undercut by an amount effective to grip the structure of the line in an interlocking manner. That is, when the line 25 is composed of twisted cords 26, the peak of the undercut portion will engage with the space between the cords 26 which will be accommodated by the undercut surface 13. In this way, the line is held in a substantially frictionless manner. That is, the cords 26 will interlock with the undercut portions 13. Consequently, the greater the load on the line 25 the more tightly it will be held by the wedge forming means.

The line engaging surfaces 11 also include line guiding surfaces 20 and 21. When a line 25 is draped onto the securing device 10 between the surfaces 11, the line guiding surfaces 20 and 21 are inclined thereby causing the line 25 to move into the wedge forming means. This construction obviates the necessity for excessive handling of the line 25 when it is being placed in the device 10. It is therefore possible that the device of this invention may be used for efficient mooring of a water craft to a relatively fixed object such as a pier or a buoy.

Figure 7:
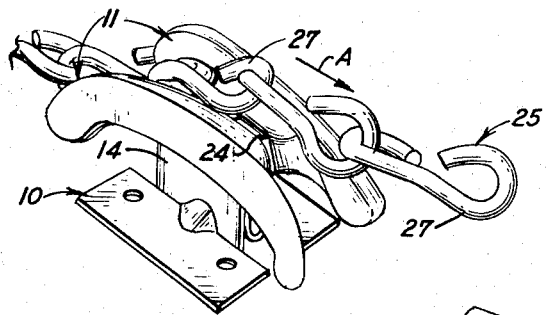
FIG. 7 is a perspective view of FIG. 1 shown used with a line composed of links of chain.
Figure 8:
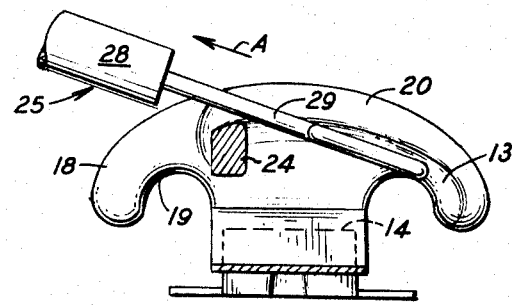
FIG. 8 is a side elevational view of the device of FIG. 1 with one side of the device removed and shown used with the end bolt in a turnbuckle.
Figure 10:
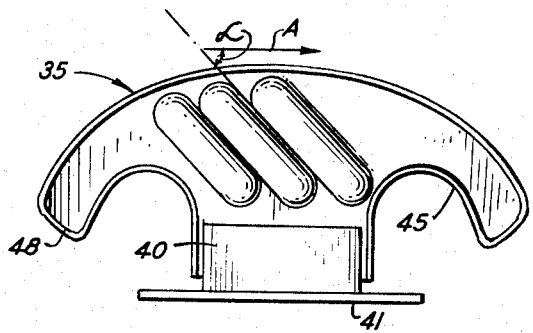
FIG. 10 is a side elevational view of the device of FIG. 8.
Figure 11:
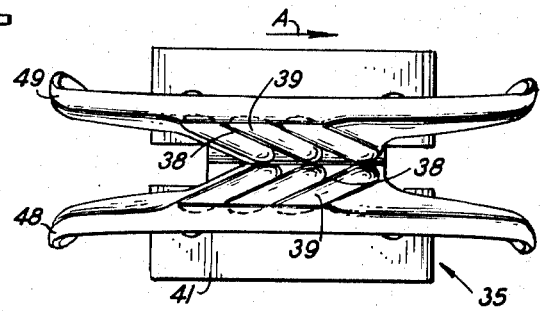
FIG. 11 is a top plan view of the device of FIG. 8.
Figure 9:
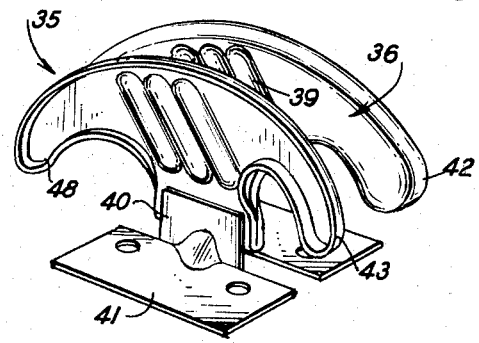
FIG. 9 is a perspective view of another embodiment made in accordance with this invention.
Figure 12:
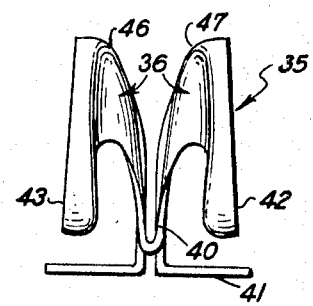
FIG. 12 is an end view of the device of FIG. 8.

Further uses of the device 10 are shown in FIGS. 7 and 8. It is seen that the line 25 of FIG. 7 is formed of chain links 27. The portions 13 are undercut by an amount effective to grip the structure of the chain links 27 once the chain has been draped over the device 10. There is an interlocking relationship between the chain links 27 and the undercut portions 13 so that the line 25 is held in a substantially frictionless manner. The greater the load on the line 25, the more tightly the links 27 are urged into the converging line engaging surfaces 11.

The same receiving and holding of line 25 composed of a turnbuckle 28 having an end bolt 29 wedged underneath the undercut portions 13 is shown in FIG. 8. The facility for use of the device 10 to hold the turnbuckle 28 may be made when the device 10 is placed on a vehicle such as a truck to hold down a load. More specifically, a camping module may be held securely to a pickup truck through the use of turnbuckles placed in the securing device 10 as shown in FIG. 8. It is seen that the device of this invention is extremely versatile and highly adaptable to the receiving and holding of many different types of lines.

A further feature of the invention is directed to the use of at least one pair of arcuate hook portions 16 and 17 that extend in a direction toward the line load. The hook portions 16 and 17 are laterally displaced with respect to each other and are turned downwardly and away from the direction of load. Such a structural configuration of the hook portions 16 and 17 includes outboard surface 18 and inboard surface 19. The inboard surface 19 extends downwardly by an amount effective to receive a load-free section 32 of the line 25 between the surface 19 and the loaded section 31. The loaded section 31 extends from the wedge forming means to the load. Therefore, the loaded line section 31 pulls against the load-free line section 32 which is disposed transversely of the laterally displaced hook portions 16 and 17. Consequently, the line 25 is pulling against itself and therefore is being more tightly engaged with the wedge forming means.

As shown in FIG. 5, the line 25 composed of twisted cords 26 is wrapped partially around the base portion 14. Such a structural configuration of the device 10 clearly allows the quick securing of the line 25 without the necessity for additional tying of the load-free section 32. With such a configuration, a load such as a watercraft which is constantly moving would be unable to work the line free from its mooring because the more the load was pulled on line 25, the more tightly it would become engaged with the wedge forming means of the device 10.

The device, generally designated 35, is another embodiment made in accordance with this invention. The line-engaging surfaces 36 form a V-shaped groove 37 that tapers toward the bottom thereof. The line-engaging surfaces 36 are connected to base portion 40 and the fastening section 41 is used to attach the device 35 to a surface. The line-engaging surfaces 36 also include wedge forming means for receiving and holding a line in a substantially frictionless manner. The wedge forming means includes a series of crests 38 with substantially arcuate troughs 39 disposed therebetween. The crests 38 engage the line 25 in the space between the cords 26. The troughs 39 receive and accommodate the cords 26. The crests 38 and troughs 39 receive and accommodate the cords 26. The crests 38 and troughs 39 are parallel with respect to each other and are inclined in a direction away from the direction of the load placed on the line 25. The angle of inclination is $\alpha$ in the drawings.

The hook portions 42 and 43 are laterally displaced by an amount effective to allow the line composed of twisted cords 26 to be disposed therebetween. As in the earlier embodiment, the inboard surface 45 extends downward by an amount effective to receive a load-free section of the line 25 between the inboard surface 45 and the loaded section which extends from the wedge forming means to the load. Consequently, the loaded line section pulls against the load-free line section which is disposed transversely of the laterally displaced hook portions 42 and 43 so that the line is pulling against itself. Therefore, the line is being more tightly engaged with the wedge forming means of the device 35. Line guiding surfaces 46 and 47 serve the same function in device 35 as the line guiding surfaces 20 and 21 served in the earlier embodiment. Arcuate hook portions 48 and 49 may maintain the load-free section of the line 25 in place when wrapped partially around the base portion 40.

The device of this invention may be made in any desired manner available in the prior art. This is, it could be cast in a single operation or die stamped and welded together at appropriate places.

The device of this invention may be used in holding all types of lines. The device may be mounted at the end of a stake for holding tents in place, may be mounted on the body of a vehicle such as a pickup truck, it may be mounted on board a ship for holding lines which perform various functions, or it may be used on surfaces to which watercraft may be moored.

While the device for securing a line has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A device for securing a line comprising:
    a. a pair of opposing walls defining line engaging surfaces upstanding from a base means,
    b. said surfaces having a structural configuration effective for mutually cooperating with a line placed therebetween,
    c. said mutually cooperating line engaging surfaces converging with respect to each other to cause the line to be wedged more tightly therebetween when a load is placed on the line, and
    d. at least one pair of arcuate hook portions at the longitudinal ends of said walls extending in a direction toward the line load and being laterally displaced with respect to each other,
    e. said hook portions being turned downwardly and extending generally toward said base means thereby forming outboard and inboard surfaces.

2. A device as defined in claim 1 wherein
said engaging surface structural configuration includes wedge forming means for receiving and holding a line in a substantially frictionless manner and line guiding surfaces which cause the line to move into the wedge forming means when a line is draped onto the device between the opposing line engaging surfaces.

3. A device as defined in claim 1 wherein
said line engaging surface structural configuration includes wedge forming means for receiving and holding a line in a substantially frictionless manner.

4. A device as defined in claim 3 wherein
said wedge forming means includes undercut line engaging surface portions that converge in a direction toward the line load,
said line engaging surface portions being undercut by an amount effective to grip the structure of the line in an interlocking manner.

5. A device as defined in claim 3 wherein
said wedge forming means includes undercut line engaging surface portions that converge in a direction toward the line load,
said line engaging surface portions being undercut by an amount effective to grip the structure of the line in an interlocking manner,
the hook portions are laterally displaced by an amount effective to allow a line composed of twisted cords to be disposed therebetween,
the inboard surface extending downwardly by an amount effective to receive a load free section of said line between the inboard surface of each hook portion and the loaded section of the line extending from the wedge forming means to the load,
whereby the loaded line section pulls against the load free line section which is disposed transversely of the laterally displaced hook portions so that the line is pulling against itself and therefore is being more tightly engaged with the wedge forming means.

6. A device as defined in claim 3 wherein
said wedge forming means includes undercut line engaging surface portions that converge in a direction toward the line load,
said line engaging surface portion being undercut by an amount effective to grip a line composed of lengths of chain or an end bolt in a turnbuckle.

7. A device as defined in claim 3 wherein
a second pair of arcuate hook portions extend in a direction away from the load and are curved downwardly.

8. A device as defined in claim 3 wherein
the hook portions are laterally displaced by an amount effective to allow a line composed of twisted cords to be disposed therebetween,
the inboard surface extending downwardly by an amount effective to receive a load free section of said line between the inboard surface of each hook portion and the loaded section of the line extending from the wedge forming means to the load,
whereby the loaded line section pulls against the load free line section which is disposed transversely of the laterally displaced hook portions so that the line is pulling against itself and therefore is being more tightly engaged with the wedge forming means.

9. A device as defined in claim 8 wherein
said wedge forming means includes a series of crests with substantially arcuate troughs therebetween,
said crests engaging with said line in the space between the cords and the troughs accommodating said cords,
said crests and troughs being parallel with respect to each other and being inclined in a direction away from the direction of the load placed on the line.

10. A device as defined in claim 9 wherein
said opposing line engaging surfaces form an open substantially V-shaped groove tapering towards the bottom.

11. A device as defined in claim 9 wherein
a second pair of arcuate hook portions extend in a direction away from the load and are curved downwardly.

12. A device as defined in claim 1 wherein
said converging engaging surfaces flare outwardly from the longitudinal axis to form said mutually cooperating surfaces.

13. A device as defined in claim 1 wherein
said surfaces have line guiding means which cause the line to move therebetween when the line is draped longitudinally of the device.

* * * * *